United States Patent
Harknett et al.

(10) Patent No.: US 10,971,935 B2
(45) Date of Patent: Apr. 6, 2021

(54) CAN BUS TERMINATING RESISTOR ARRANGEMENT

(71) Applicant: CLARK EQUIPMENT COMPANY, Statesville, NC (US)

(72) Inventors: Nicholas Harknett, Statesville, NC (US); Sean Herman, Statesville, NC (US)

(73) Assignee: CLARK EQUIPMENT COMPANY, Statesville, NC (US)

( * ) Notice: Subject to any disclaimer, the term of this patent is extended or adjusted under 35 U.S.C. 154(b) by 259 days.

(21) Appl. No.: 16/043,939

(22) Filed: Jul. 24, 2018

(65) Prior Publication Data

US 2019/0027937 A1    Jan. 24, 2019

Related U.S. Application Data

(60) Provisional application No. 62/536,205, filed on Jul. 24, 2017.

(51) Int. Cl.
| | |
|---|---|
| *G06F 13/40* | (2006.01) |
| *G06F 13/36* | (2006.01) |
| *H02J 3/38* | (2006.01) |
| *F02B 63/04* | (2006.01) |
| *H04L 12/40* | (2006.01) |

(52) U.S. Cl.
CPC ............. *H02J 3/381* (2013.01); *F02B 63/04* (2013.01); *F02B 63/047* (2013.01); *H04L 12/40* (2013.01); *H04L 12/40163* (2013.01); *H04L 2012/40215* (2013.01)

(58) Field of Classification Search
CPC .. F02B 63/04; F02B 63/047; H04L 12/40163; H04L 12/40; H04L 2012/40215; H02J 3/381
See application file for complete search history.

(56) References Cited

U.S. PATENT DOCUMENTS

| | | | |
|---|---|---|---|
| 9,896,982 B1 * | 2/2018 | Zhang | F02D 25/04 |
| 2003/0194015 A1 * | 10/2003 | Suganuma | H04L 69/40 |
| | | | 375/257 |
| 2006/0132170 A1 * | 6/2006 | Fahrbach | G06F 13/4086 |
| | | | 326/30 |
| 2013/0214597 A1 * | 8/2013 | Malo | H02J 9/06 |
| | | | 307/23 |
| 2014/0167703 A1 * | 6/2014 | Tzivanopoulos | H04L 25/0298 |
| | | | 320/136 |

(Continued)

*Primary Examiner* — Jared Fureman
*Assistant Examiner* — Esayas G Yeshaw
(74) *Attorney, Agent, or Firm* — Michael Best & Friedrich LLP

(57) ABSTRACT

A power generation system including a controller area network (CAN) bus and a first power source having a first electrical generator, a first controller connected to the CAN bus, and a first resistor. The power generation system also includes a second power source having a second electrical generator, a second controller connected to the CAN bus, a second resistor, and a user-activated switch. The user-activated switch is movable between a first position, so that the second resistor acts as a terminating resistor to signify another end of the CAN bus and a second position so that the second resistor is prevented from acting as a terminating resistor.

16 Claims, 4 Drawing Sheets

(56) References Cited

U.S. PATENT DOCUMENTS

| | | | |
|---|---|---|---|
| 2015/0130280 A1* | 5/2015 | O'Reilly | H02J 9/066 |
| | | | 307/65 |
| 2016/0275032 A1* | 9/2016 | Machauer | G06F 13/4022 |
| 2017/0033595 A1* | 2/2017 | Mandarino | H02J 9/062 |
| 2017/0110877 A1* | 4/2017 | Reddy | H02J 1/12 |
| 2018/0145677 A1* | 5/2018 | Handy | H02M 7/06 |
| 2018/0358839 A1* | 12/2018 | Perez | H02J 3/381 |

* cited by examiner

CAN BUS TERMINATING RESISTOR ARRANGEMENT

CROSS-REFERENCE TO RELATED APPLICATIONS

This application claims priority to U.S. Provisional Patent Application No. 62/536,205, filed on Jul. 24, 2017, and entitled CAN BUS TERMINATING RESISTOR ARRANGEMENT, the contents of which is herein incorporated by reference in its entirety.

BACKGROUND

Power generation systems, including portable power generation systems are often used to provide power in remote locations. In some cases, multiple generators must be used together to provide the desired quantity of power. In these situations, it is desirable to connect the various generators to one another to coordinate their operation. Other types of power generation systems including stationary power generation systems can also include multiple generators that are best implemented when connected to coordinate their operation.

SUMMARY

The present invention provides, in one aspect, a power generation system including a controller area network (CAN) bus and a first power source having a first electrical generator, a first controller connected to the CAN bus, a first resistor, and a first user-activated switch. The power generation system also includes a second power source having a second electrical generator, a second controller connected to the CAN bus, a second resistor, and a second user-activated switch. The first user-activated switch is in a closed position to terminate a first end of the CAN bus, and the second-user activated switch is in a closed position to terminate a second end of the CAN bus.

The present invention provides, in another aspect, a method of adjusting communication between a plurality of power sources. The method includes connecting a first power source and a second power source to a CAN bus, and configuring communication between the first power source and the second power source over the CAN bus by connecting a first resistor of the first power source to the CAN bus and connecting a second resistor of the second power source to the CAN bus. The method further includes connecting a third power source to the CAN bus, and configuring communication between the first power source, the second power source, and the third power source over the CAN bus by disconnecting the second resistor from the CAN bus and connecting a third resistor of the third power source to the CAN bus.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
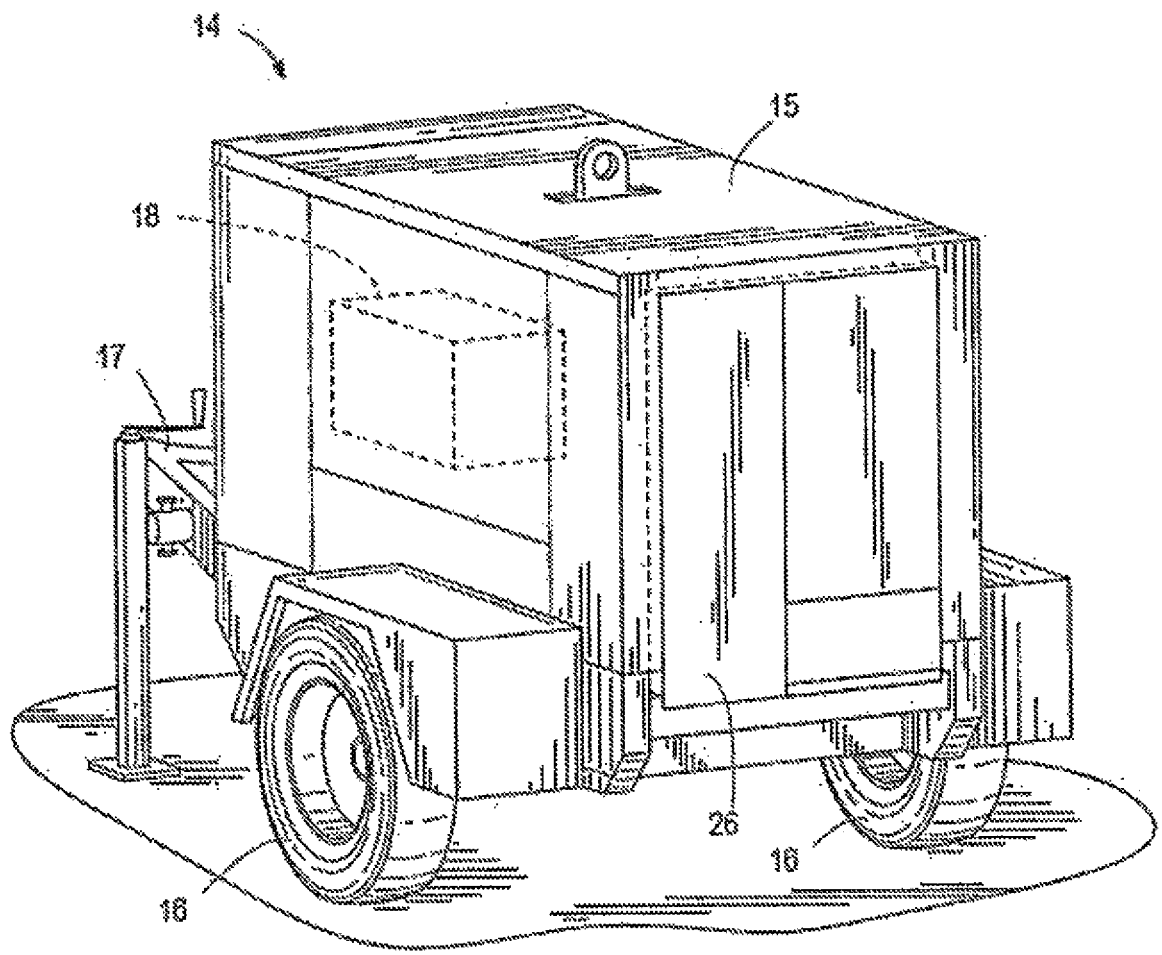
FIG. 1 is a perspective view of a mobile power source.

FIG. 1 illustrates a mobile power source 14 (or generator assembly 14). While embodiments discussed herein focus on mobile or portable power sources, in other embodiments, stationary power sources may be employed. The mobile power source 14 is typically used at locations where electrical power from the power grid is not available. The mobile power source 14 includes a housing 15 and can be implemented as, for example, a mobile or a portable generator, a construction or rental generator, a mobile light tower, or an onboard power generator. Although the mobile power source 14 is shown to be mobile on a pair of wheels 16 and equipped with a trailer hitch 17, the mobile power source 14 may not have wheels, or may have additional wheels. In other words, the power source 14 is configured to be movable to a desired (or targeted) location for the generation of electricity (or electrical power).

The mobile power source 14 has a generator 18 mounted within the housing 15 to generate electrical power. In other words, the generator 18 is operable to output electrical power. The electrical power can be a single phase or three-phase alternating current (AC) electrical power at a desired voltage and frequency. The mobile power source 14 can also include one or more transformers (not shown) to facility an output of current at multiple desired voltages. In another example of embodiments, the power source 14 is configured to provide electrical power as a direct current (DC) power supply at a desired voltage.

Figure 2:
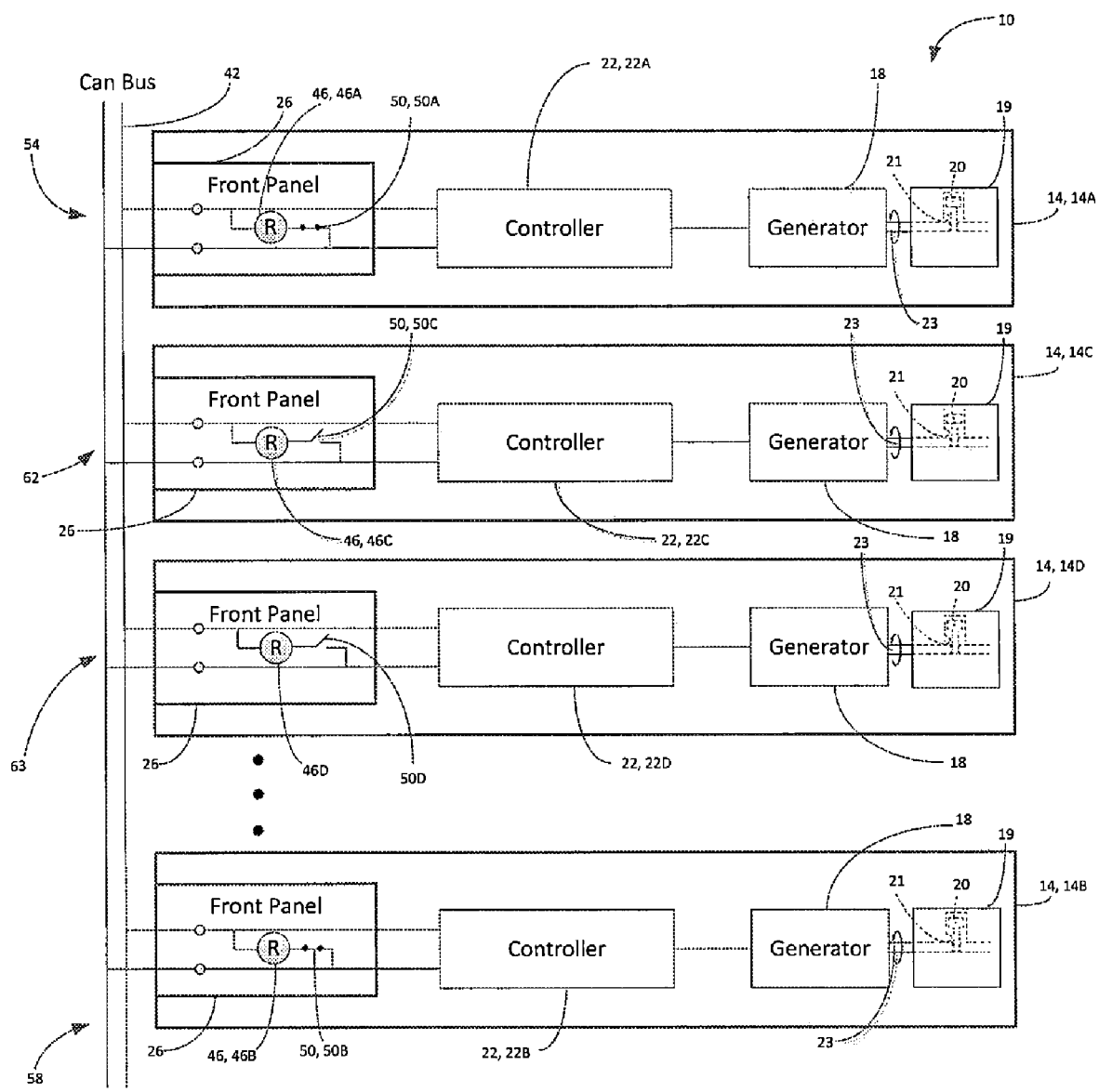
FIG. 2 is a schematic illustration of a power generation system including a plurality of mobile power sources.

With reference to FIG. 2, each power source 14 includes a prime mover 19 operably connected to the generator 18. The prime mover 19 is an engine, and more specifically a reciprocating piston engine (e.g., an internal combustion, compression-ignition engine, etc.). As such, the engine 19 can include at least one piston 20 positioned within an associated cylinder 21. The at least one piston 20 (or a plurality of pistons) is configured to reciprocate in the associated cylinder 21 to rotate a drive shaft 23. The drive shaft 23 is coupled to the generator 18, and rotation of the drive shaft 23 drives the generator 18 to produce electrical power. While the illustrated embodiment depicts the prime mover 19 as a reciprocating piston internal combustion engine, in other embodiments, the prime mover 19 can be any engine or motor suitable to drive the generator 18. An example of a prime mover is a diesel engine. The power source 14 can also be configured to be operated by a plurality of different fuels (or fuel sources or multiple fuels). For example, in one embodiment, the power source 14 can operate on a first fuel source and a second fuel source, with the fuel sources being different fuel sources. Examples of suitable fuel sources can include, but is not limited to, diesel fuel, propane, liquid propane, gasoline, kerosene, natural gas, or any other suitable fuel.

With continued reference to FIG. 2, each power source 14 includes a controller 22 that is configured to control the operation of the electrical generator 18. In some embodiments, the controller 22 can also control the prime mover 19

(e.g., controls the engine speed of the prime mover 19, etc.), and/or an alternator on the prime mover 19. The controller 22 can be implemented as a single controller or more than one controller (e.g., a first controller to control operation of the electrical generator 18, a second controller to the prime mover 19, etc.). The illustrated controller 22 is a digital controller. In other embodiments, the controller 22 is an analog controller. The controller 22 is configured to communicate with other controllers and devices by, for example, communication on a Controller Area Network (CAN) bus. As discussed in additional detail below, the controller 22 of one power source 14 can communicate with a controller 22 of a second power source 14 through the CAN bus.

Figure 3:
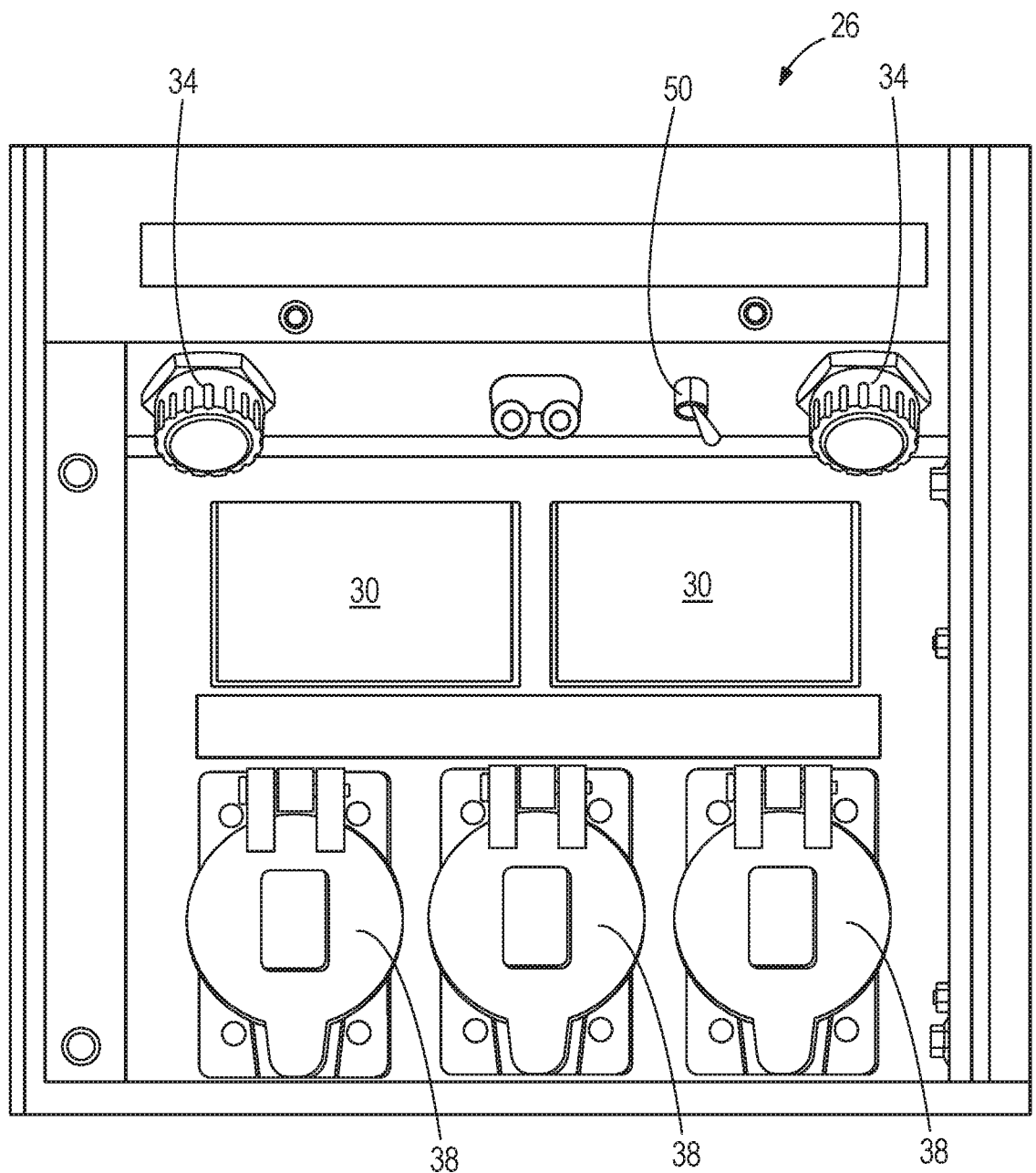
FIG. 3 is a perspective view of a control panel of the mobile power source of FIG. 1.

With reference to FIG. 3, each power source 14 also includes a control panel 26 (or user accessible panel 26) that provides a user access to the controller 22 for the associated power source 14. In the illustrated embodiment, the control panel 26 is a front panel positioned on a front of the power source 14. In other words, the front panel 26 is accessible by the user. The control panel 26 includes gauges 30 that indicate the operational status of the power source 14 as well as controls 34 that can be used to vary the operation of the power source 14. In addition, electrical outlets 38 are positioned on the front panel 26, which allows a user to attach one or more devices to the power source 14 to receive electrical power.

With reference back to FIG. 2, a power generation system 10 includes a plurality of mobile power sources 14 (or mobile electrical generation systems 14). While FIG. 2 illustrates at least four power sources 14, in other embodiments, the power generation system 10 includes at least two power sources 14. Multiple power sources 14 may be required, for example, to provide electrical power at desired levels. In addition, with the plurality of power sources 14 coupled together in the power generation system 10, the power generation system 10 can operate with a portion of the generators 18 (i.e., fewer than all the generators 18) and/or all the generators 18. In other words, the number of generators 18 that are operational at a given time (or given moment) can be a function of the load on the power generation system 10. In low system load conditions, fewer than all the generators 18 can operate to meet load demand, while in high system load conditions, all the generators 18 can operate to meet load demand. In addition, by operating some of the generators 18 with a less than maximum load, for example, less fuel is required to operate the prime movers 19 of all the power sources 14, resulting in improved (or optimized) efficiency of the system 10.

The power generation system 10 includes a CAN bus 42 that facilitates communication between the power sources 14. The CAN bus 42 provides for electrical communication between the controllers 22 of each associated power source 14. Communication between the power sources 14 can include control signals to determine which of the power sources 14 in the power generation system 10 should be operational at any given time. In addition, diagnostic and functional information related to the individual power sources 14 can be communicated over the CAN bus 42. To facilitate proper operation of the CAN bus 42, terminating resistors 46 are positioned at each end of the CAN bus 42.

To facilitate the proper placement of the terminating resistor 46 at each end of the CAN bus 42, each power source 14 includes a resistor 46 and a user-activated switch 50. The user-activated switch 50 is movable between an open position and a closed position. When the switch 50 is in the closed position, the resistor 46 operates as a terminating resistor at one end of the CAN bus 42. When the switch 50 is in the open position, the resistor 46 is not connected to the CAN bus 42. However, the controller 22 of the power source 14 remains connected to the CAN bus 42 regardless of the switch 50 position. In particular, the user-activated switch 50 is electrically connected in series with the resistor 46, and the user-activated switch 50 and the resistor 46 together are connected across the CAN bus 42 when the switch 50 is closed. In the illustrated embodiment, the switch 50 is a toggle switch. However, in other embodiments, the switch 50 can be any suitable user-activated switch or actuator (e.g., a push-button, a rocker switch, a touch pad, a rotary switch, etc.).

In some embodiments, the power generation system 10 can have two power sources 14. In these embodiments, both power sources 14 have their respective switches 50 in the closed position to properly terminate the CAN bus 42. In other embodiments, the power generation system 10 can have more than two power sources 14. In these embodiments, the two power sources 14 at the ends (e.g., at physical ends, at electrical ends, etc.) of the CAN bus 42 have their switches 50 in the closed position to properly terminate the CAN bus 42. Any other power sources 14 connected to the CAN bus have their switches 50 configured in the open position to configure the CAN bus 42 to include two terminating resistors at the CAN bus ends. The switch 50 is positioned on the control panel 26 of each power source 14 (see FIG. 3) to provide user access and facilitate an easy transition between the open position and the closed position. This allows any power source 14 to be quickly and easily transitioned to an end power source 14 on the CAN bus 42.

With continued reference to FIG. 2, the power generation system 10 is illustrated with four power sources 14A, 14B, 14C, 14D, with each power source 14 including its own resistor 46 and its own switch 50. Specifically, the power generation system 10 includes a first power source 14A with a first controller 22A connected to the CAN bus 42, a first resistor 46A, and a first user-activated switch 50A. The power generation system 10 also includes a second power source 14B with a second controller 22B connected to the CAN bus 42, a second resistor 46B, and a second user-activated switch 50B. The first user-activated switch 50A is in a closed position to terminate a first end 54 of the CAN bus 42, and the second user-activated switch 50B is in a closed position to terminate a second end 58 of the CAN bus 42. Thus, the first power source 14A is a first end power source and the second power source 14B is a second end power source of the CAN bus 42. The switches 50 of the non-end power sources 14 are all configured to the open position. Specifically, the power generation system 10 includes a third power source 14C including a third controller 22C connected to the CAN bus 42, a third resistor 46C, and third user-activated switch 50C. The third controller 22C is connected to the CAN bus 42 at a position 62 located between the first controller 22A connection to the CAN bus 42 and the second controller 22B connection to the CAN bus 42. In particular, the third user-activated switch 50C is in the open position to disconnect the third resistor 46C from the CAN bus 42. Finally, the power generation system 10 also includes a fourth power source 14D including a fourth controller 22D connected to the CAN bus 42, a fourth resistor 46D, and fourth user-activated switch 50D. The fourth controller 22D is connected to the CAN bus 42 at a position 63 located between the first controller 22A connection to the CAN bus 42 and the second controller 22B connection to the CAN bus 42. In particular, the fourth user-activated switch 50D is in the open position to disconnect the fourth resistor 46D from the CAN bus 42.

It should be appreciated that while the power generation system 10 illustrated in FIG. 2 includes four power sources 14A-14D connected to the CAN bus 42, in other embodiments of the power generation system 10, at least two, and more specifically three or more power sources 14 (or generators) can be connected to the CAN bus 42. It should further be appreciated that any two of the power sources 14 can be configured to establish the ends 54, 58 of the CAN bus 42 by actuating the associated switch 50 to the closed position to connect the resistor 46 to the CAN bus 42. With the ends 54, 58 of the CAN bus established by two power sources, any number of additional power sources can be connected to the CAN bus 42 therebetween.

In operation, the user selects the number of power sources 14 needed for a particular application. Each power source 14 in the power generation system 10 is operated as desired to provide for optimal efficiency, while still delivering the necessary electrical power to meet a load demand. The switch 50A for the first power source 14A is set to the closed position to place the resistor 46A in the circuit including the CAN bus 42 to terminate the first end 54 of the CAN bus 42. Each subsequent power source 14 (e.g., the third power source 14C, the fourth power source 14D, and any additional N number of power sources 14, etc.) is connected to the CAN bus 42 with its switch 50 (e.g., switch 50C, 50D, 50N, etc.) in the open position to configure the resistor 46 (e.g., resistor 46C, 46D, 46N, etc.) so that it is not placed in the circuit with the CAN bus 42. Finally, the second power source 14B positioned at the other end of the CAN bus 46. The second power source 14B is connected to the CAN bus 42 with the switch 50B set in the closed position to place the resistor 46B in the circuit including the CAN bus 42 to terminate the second end 58 of the CAN bus 42. To place the resistor 46 into the circuit in the proper configuration, the user actuates each switch 50 on the control panel 26 for each power source 14 into the desired position. This allows the user to quickly and easily configure the resistors 46 and the CAN bus 42 as necessary for desired operation using only the switch 50 on the control panel 26 of each power source 14.

As such, a method of adjusting communication between a plurality of power sources 14 includes connecting a first power source 14A and a second power source 14B to the CAN bus 42, and configuring communication between the first power source 14A and the second power source 14B over the CAN bus 42 by connecting a first resistor 46A of the first power source 14A to the CAN bus 42 and connecting a second resistor 46B of the second power source 14B to the CAN bus 42. The method can further include adding a third power source 14C to the power generation system 10. More specifically, the method includes connecting a third power source 14C to the CAN bus 42, and configuring communication between the first power source 14A, the second power source 14B, and the third power source 14C over the CAN bus 42 by disconnecting the second resistor 46B of the second power source 14B from the CAN bus 42 and connecting a third resistor 46C of the third power source 14C to the CAN bus 42. The third power source 14C can be connected to the CAN bus 42 with the user-activated switch 50C in the open position (and thus the third power source 14C is not an end power source on the CAN bus 42). In other embodiments, the third power source 14C can be connected to the CAN bus 42 as an end power source on the CAN bus 42. As such, the user-activated switch 50C of the third power source 14C is positioned in the closed position, while the user-activated switch 50A, B of one of the other connected power sources 14A, 14B is positioned in an open configuration. As such, the first and third power sources 14A, 14C are the ends of the CAN bus 42. The method can further include disconnecting the third power source 14C from the CAN bus 42, and re-configuring communication between the first power source 14A and the second power source 14B by actuation of the respective user-activated switches 50A, B. Moreover, the method can further include connecting a fourth power source 14D to the CAN bus 42, and configuring communication between the first power source 14A, the second power source 14B, the third power source 14C, and the fourth power source 14D over the CAN bus 42 by connecting the fourth power source 14D to the CAN bus 42 between the power sources positioned between the first and second ends 54, 58 of the CAN bus 42.

Figure 4:
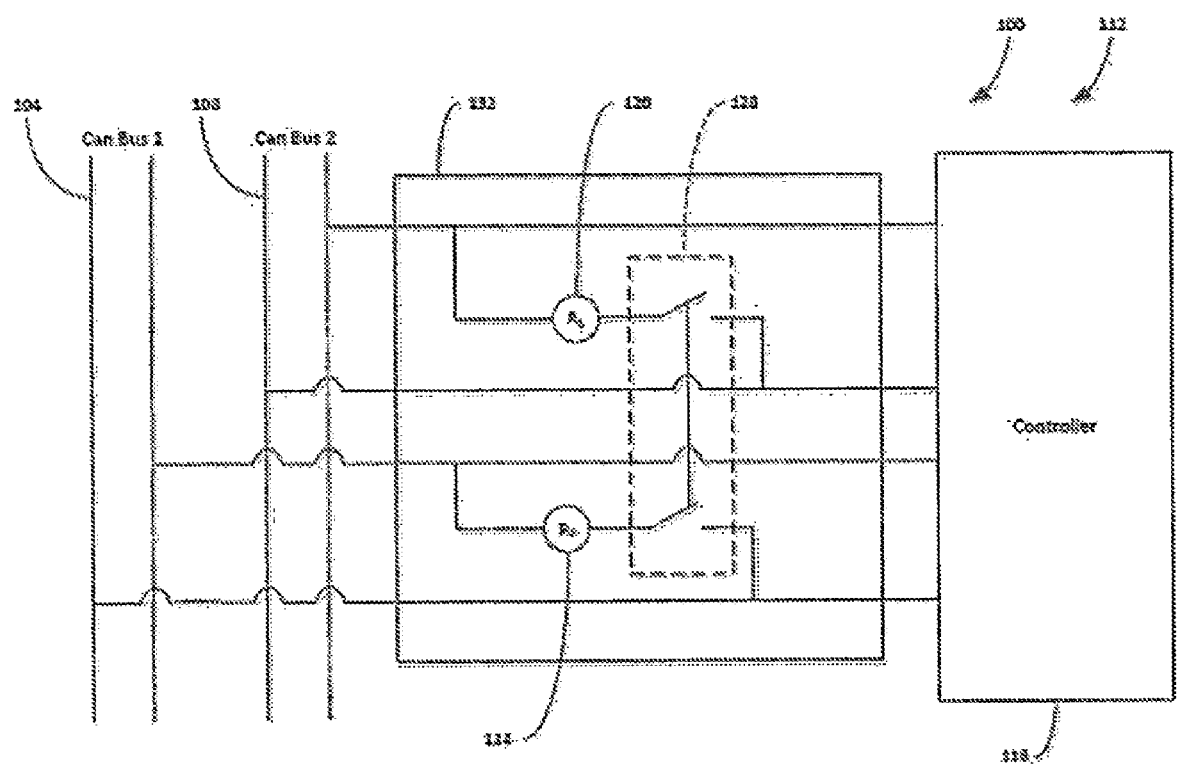
FIG. 4 is a schematic illustration of another embodiment of a power generation system that includes two CAN buses and a plurality of associated mobile power sources, though for clarity only one mobile power source is illustrated.

With reference to FIG. 4, an alternative power generation system 100 includes a first CAN bus 104, a second CAN bus 108, and a power source 112 with a power source controller 116 coupled to both the first CAN bus 104 and the second CAN bus 108. It should be appreciated that the power generation system 100 of FIG. 4 only illustrates a single power source 112 (with portions removed for clarity) to focus on the multiple resistors 120, 124 that selectively connected to multiple CAN buses 104, 108. Similar to the power generation system 10 of FIG. 2, the power generation system 100 includes at least two power sources 112 (or a plurality of power sources 112). In other words, FIG. 4 illustrates one of at least two power sources connected to both the first CAN bus 104 and the second CAN bus 108. The power source 112 includes a first resistor 120 selectively coupled to the first CAN bus 104, and a second resistor 124 (i.e., an auxiliary resistor) selectively coupled to the second CAN bus 108. As mentioned above, the power source 112 is substantially the same as the power source 14, and only a portion of the power source 112 is being illustrated in FIG. 4 for clarity. A switch 128 is coupled to a control panel 132 of the power source 112 and is user-activated. The switch 128 can be a single throw, double pole switch that connects and/or disconnects the first resistor 120 to the first CAN bus 104 and the second resistor 124 to the second CAN bus 108. In other words, a single actuation of the switch 128 connects or disconnects both resistors 120, 124. In alternative embodiments, the power source 112 includes two separate switches to independently control selection of resistors into the two CAN buses 104, 108.

Although the invention has been described in detail with reference to certain preferred embodiments, variations and modifications exist within the scope and spirit of one or more independent aspects of the invention as described. Various features and advantages of the invention are set forth in the following claims.

What is claimed is:
1. A power generation system comprising:
  a controller area network (CAN) bus;
  a first power source including a first electrical generator, a first controller connected to the CAN bus, and a first resistor configured to act as a terminating resistor signifying one end of the CAN bus;
  a second power source including a second electrical generator, a second controller connected to the CAN bus, a second resistor, and a user-activated switch associated with the second power source, the user-activated switch being movable between a first position, so that the second resistor acts as a terminating resistor to signify another end of the CAN bus and a second position so that the second resistor is prevented from acting as a terminating resistor; and a third power source including a third electrical generator, a third controller connected to the CAN bus, a third resistor, and a user-activated switch associated with the third power source, wherein the user-activated switch associated with the third power source is movable between a first position, so that the third resistor acts as a terminating resistor to signify an end of the CAN bus and a second position so that the third resistor is prevented from acting as a terminating resistor.

2. The power generation system of claim 1, wherein the third controller is connected to the CAN bus at a position located between the first controller connection to the CAN bus and the second controller connection to the CAN bus and wherein the user-activated switch associated with the third power source is in the second position.

3. The power generation system of claim 1, wherein the second controller is connected to the CAN bus at a position located between the first controller connection to the CAN bus and the third controller connection to the CAN bus and wherein the user-activated switch associated with the third power source is in the first position and the user-activated switch associated with the second power source is in the second position.

4. The power generation system of claim 1, wherein the user-activated switch associated with the third power source is positioned on a control panel of the third generator.

5. The power generation system of claim 1, wherein the CAN bus is a first CAN bus and wherein the power generation system further includes a second CAN bus.

6. The power generation system of claim 5, wherein the first controller and the second controller are connected to the second CAN bus.

7. The power generation system of claim 6, wherein the first power source includes a first auxiliary resistor connected to the second CAN bus, and wherein the second power source includes a second auxiliary resistor connected to the second CAN bus.

8. A power generation system comprising:
a controller area network (CAN) bus;
a first power source including a first electrical generator, a first controller connected to the CAN bus, and a first resistor configured to act as a terminating resistor signifying one end of the CAN bus; and
a second power source including a second electrical generator, a second controller connected to the CAN bus, a second resistor, and a user-activated switch associated with the second power source, the user-activated switch being movable between a first position, so that the second resistor acts as a terminating resistor to signify another end of the CAN bus and a second position so that the second resistor is prevented from acting as a terminating resistor,
wherein the user-activated switch associated with the second power source is electrically connected in series with the second resistor.

9. The power generation system of claim 8, wherein the user-activated switch associated with the second power source is a toggle switch.

10. A power generation system comprising:
a controller area network (CAN) bus;
a first power source including a first electrical generator, a first controller connected to the CAN bus, and a first resistor configured to act as a terminating resistor signifying one end of the CAN bus; and
a second power source including a second electrical generator, a second controller connected to the CAN bus, a second resistor, and a user-activated switch associated with the second power source, the user-activated switch being movable between a first position, so that the second resistor acts as a terminating resistor to signify another end of the CAN bus and a second position so that the second resistor is prevented from acting as a terminating resistor,
wherein the user-activated switch associated with the second power source is positioned on a control panel of the second generator.

11. A power generation system comprising:
a controller area network (CAN) bus;
a first power source including a first electrical generator, a first controller connected to the CAN bus, and a first resistor configured to act as a terminating resistor signifying one end of the CAN bus;
a second power source including a second electrical generator, a second controller connected to the CAN bus, a second resistor, and a user-activated switch associated with the second power source, the user-activated switch being movable between a first position, so that the second resistor acts as a terminating resistor to signify another end of the CAN bus and a second position so that the second resistor is prevented from acting as a terminating resistor; and
a user-activated switch associated with the first power source movable between a first position and a second position, wherein in the second position, the first resistor is prevented from acting as a terminating resistor.

12. A method of adjusting communication between a plurality of power sources, the method comprising:
connecting a first power source and a second power source to a controller area network (CAN) bus;
configuring communication between the first power source and the second power source over the CAN bus by manipulating a provided user-activated switch coupled to the second power source to connect a resistor of the second power source to the CAN bus;
connecting a third power source to the CAN bus; and
configuring communication between the first power source, the second power source, and the third power source over the CAN bus by connecting a third resistor of the third power source to the CAN bus and manipulating the user-activated switch coupled to the second power source to disconnect the resistor of the second power source from the CAN bus, wherein in response to manipulating the user-activated switch to disconnect the resistor of the second power source from the CAN bus, the first power source, the second power source, and the third power source remain in communication over the CAN bus.

13. The method of claim 12, wherein the user-activated switch coupled to the second power source is provided so as to be accessible from a control panel of the second power source.

14. The method of claim 12, further comprising disconnecting the third power source from the CAN bus, and re-configuring communication between the first power source and the second source by actuation of the user-activated switch coupled to the second power source.

15. The method of claim 12, wherein the second power source is connected to the CAN bus between the first power source and the third power source.

16. The method of claim 12, further comprising connecting a fourth power source to the CAN bus; and configuring communication between the first power source, the second power source, the third power source, and the fourth power source over the CAN bus by connecting the fourth power source to the CAN bus between the first power source and the third power source.

\* \* \* \* \*